US005823621A

United States Patent [19]

Broadhead

[11] Patent Number: 5,823,621

[45] Date of Patent: Oct. 20, 1998

[54] REDUCED SHEAR ASSEMBLY FOR RECLINE SEAT BACK OF A WHEELCHAIR

[75] Inventor: Douglas Broadhead, Brampton, Canada

[73] Assignee: Invacare Corporation, Elyria, Ohio

[21] Appl. No.: 745,715

[22] Filed: Nov. 12, 1996

[51] Int. Cl.[6] ...... B60N 2/02

[52] U.S. Cl. ...... 297/354.13; 297/353; 297/358

[58] Field of Search ...... 297/354.13, 353, 297/361.1, 362.12, 358, 362.11, 354.12, DIG. 4; 180/907; 280/250.1, 304.1

[56] References Cited

U.S. PATENT DOCUMENTS

| | | | |
|---|---|---|---|
| 5,181,762 | 1/1993 | Beumer | 297/358 |
| 5,261,725 | 11/1993 | Rudolph | 297/354.13 X |
| 5,320,412 | 6/1994 | Eakins et al. | 297/353 |
| 5,549,357 | 8/1996 | Counts et al. | 297/354.13 |
| 5,556,157 | 9/1996 | Wempe . | |
| 5,634,688 | 6/1997 | Ellis | 297/353 X |

FOREIGN PATENT DOCUMENTS

| | | | |
|---|---|---|---|
| 1957744 | 6/1970 | Germany | 297/354.13 |

*Primary Examiner*—Laurie K. Cranmer
*Attorney, Agent, or Firm*—Fay, Sharpe, Beall, Fagan, Minnich & McKee

[57] ABSTRACT

A reduced shear reclining seat back assembly employs a single rotary actuator for reclining a seat back relative to a seat portion and controlling movement of a seat back member in response to the reclining operation. A rotary actuator includes a first arm pivotally secured to the seat back, preferably through a link which is connected to the movable back member. A second arm of the actuator is pivotally secured to the seat portion. As the angle between the first and second arms decreases, the seat back reclines and the movable seat back member is drawn toward a seat pivot axis. Likewise, when the angle between the arms increases, the seat back is brought to an upright position and the movable seat member travels away from the seat pivot axis.

10 Claims, 3 Drawing Sheets

REDUCED SHEAR ASSEMBLY FOR RECLINE SEAT BACK OF A WHEELCHAIR

BACKGROUND OF THE INVENTION

This invention pertains to the art of wheelchairs and, more particularly, to a wheelchair seat back that reclines. The invention is particularly applicable to a reduced or low shear seat back assembly and will be described with particular reference thereto. However, it will be appreciated that the invention has broader applications and may be employed in related environments and applications.

It is known in the art to provide seat backs in the wheelchair environment that allow the user to be selectively positioned in upright and reclined positions. The seat back rotates about a seat pivot axis relative to the seat base or seat portion to allow the user to assume a reclined or upright position, or any position in between. The user's legs and buttocks remain substantially stationary on the seat portion during the reclining action. Shear forces, though, are imposed on the user's back as the seat back pivots relative to the seat portion. Thus, after repeated use, the user's back is adversely effected by the friction or shearing action between the user and the seat back during the recline operation.

Representative prior art structures that attempt to address this problem are shown and described in U.S. Pat. Nos. 4,333,681; 4,655,471; and 5,297,021. These patents describe various complex structural arrangements that allow the surface of the seat back that supports the user to slide in a direction toward and away from the pivot axis of the seat back during the recline operation. Particularly, the seat back surface slides relative to a support structure of the seat back.

Although prior art arrangements have met with some commercial success, the industry still seeks a compact, reliable, and economical seat back assembly that reduces the friction or shear transfer between the seat back and the user.

SUMMARY OF THE INVENTION

The present invention contemplates a new and improved seat back assembly that uses a single rotary actuator to recline the seat back and move the seat back toward and away from the seat pivot axis along its support structure.

According to the present invention, a seat back is pivoted relative to the seat portion to move between upright and reclined positions. The rotary actuator includes a first arm pivotally secured to the seat back and pivotally secured to a movable back member. A second arm of the actuator is pivotally secured to the seat portion. This arrangement reclines the seat back as the angle changes between the first and second arms and the back member moves in response to the reclining seat back to limit shear forces imposed on the user.

According to yet another aspect of the invention, a link is pivotally secured at opposite ends to the first arm and the back member, respectively, to provide longitudinal movement of the seat member that reduces the transfer of shear forces to the user as the seat back reclines.

A principal advantage of the invention is the provision of a single actuator that both reclines and moves the seat member to reduce shear forces being transferred to the user.

Another advantage of the invention resides in a compact, reduced shear seat back recline assembly.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
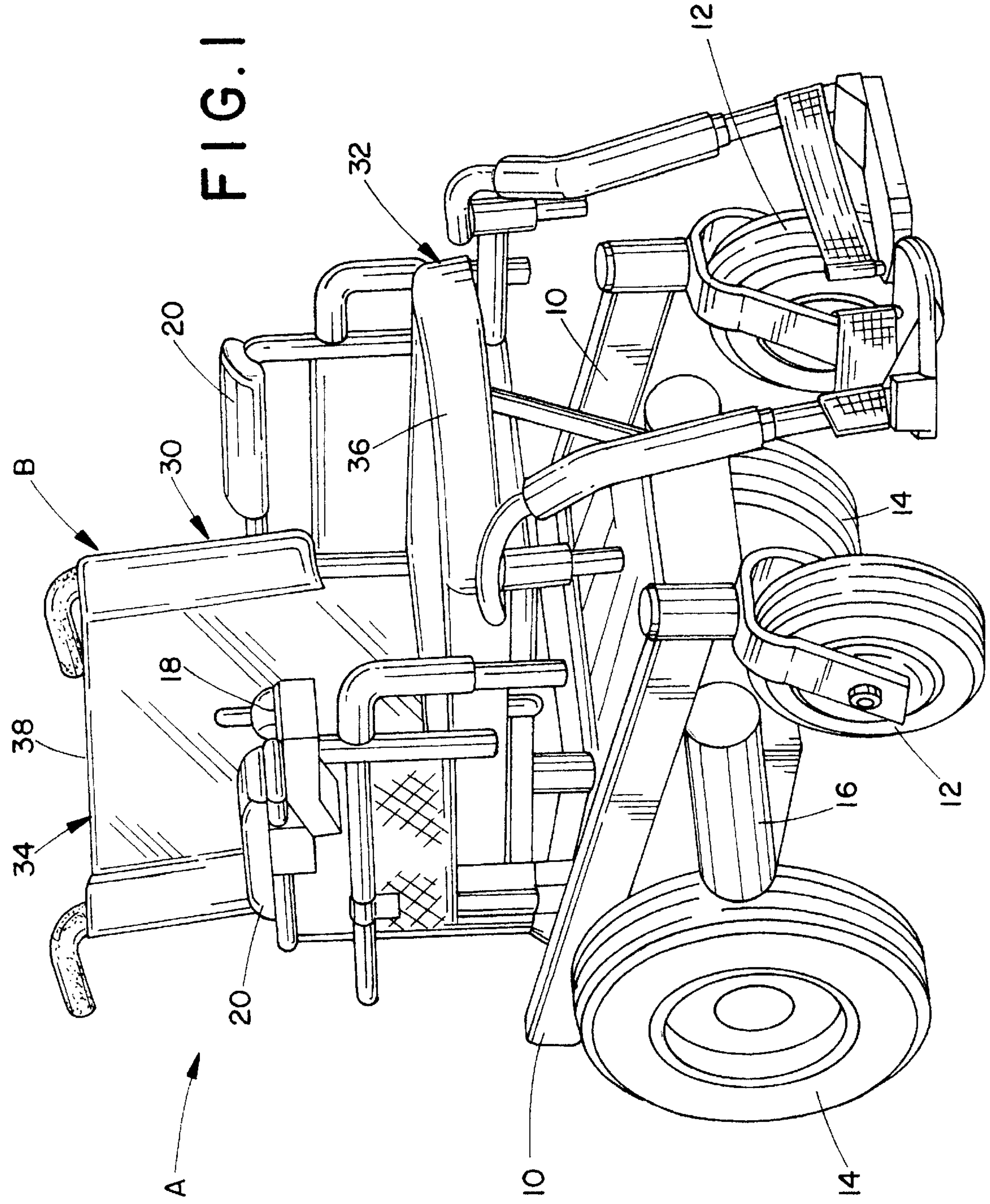
FIG. 1 is a perspective view of a power wheelchair modified to incorporate the subject invention.

Referring now to the drawings wherein the showings are for the purposes of illustrating the preferred embodiment of the invention only and not for purposes of limiting same, the FIGS. show a wheelchair A incorporating a reduced shear seat back recline assembly B. More particularly, and with reference to FIG. 1, the wheelchair A includes a frame 10 to which is mounted a pair of small diameter front wheels 12 and a pair of larger diameter rear wheels 14. The frame is preferably of a sturdy, rigid construction such as aluminum members having a rectangular cross section that support caster mountings for the front wheels 12 and the drive assembly associated with the rear wheels 14. The illustrated power wheelchair also includes on-board batteries (not shown) that supply power to drive motors 16 associated with the respective rear wheels. A controller, such as joystick assembly 18, is conveniently mounted on an armrest 20. As is conventional in the art, movement of the joystick in a selected direction controls operation of the motors for driving the rear wheels, and the front wheels rotate about their respective vertical axes in response to the driving force imposed by the rear wheels. The power wheelchair as described above is of well known structure and, for example, is commercially available from the assignee of the subject invention. Catalog Form No. 94-27 Rev. 10/95 of Invacare Corporation shows and describes power wheelchairs of the type shown in FIG. 1, details of which are incorporated herein by reference for general background purposes.

As also illustrated in FIG. 1, a seat 30 includes a seat base or seat portion 32 and a seat back 34. Each of the seat portion and seat back is more particularly shown in FIGS. 2 and 3. Underlying support structures 36, 38 support the seat portion and the seat back, respectively, to which upholstery, cushions, or other seating systems may be secured. Thus, the seat 30 is secured to the frame 10 and, if desired, may include a tilt actuating assembly 40 or may be directly connected to the frame 10. In the latter situation, the tilt function is either manually operable or not available. Particular details of the tilt mechanism 40 form no part of the subject invention and thus will not be described further herein.

The rear portion of the support structure 36 of the seat base extends upwardly and receives a pin member 42. The pin member defines the seat pivot axis whereby the seat back can recline relative to the seat portion. The recline assembly further includes a triangular-shaped support member 50 secured along one leg to the support structure of the seat back. The third angle of the triangular support member is disposed outwardly from a plane defined by the seat back support structure 38 and defines a pivot connection 54 with the actuator as will be described in further detail below. The actuator 56 is a rotary actuator in which a first arm 58 extends outwardly from the actuator housing. An intermediate region of the first arm is connected via pin member 54 to the support member 50. Moreover, an outer end of the first arm is pivotally connected at 60 with a link 70. Thus, the link 70 forms an intermediate connection between the actuator first arm and the seat back. Particularly, the link has pivot connections 60 and 72 at opposite ends thereof to join the link with the actuator and a movable seat back member 74.

The movable seat back member 74 is adapted for sliding movement along the support structure 38. It is advanced and retracted along the support structure and moves toward and away from the pivot axis 42 in response to the rotary actuator 56 operating through link 70. Thus, the movement of the end 72 of the link is constrained to a plane generally defined by the seat back support structure 38. As shown in the upright position of FIG. 2, the seat back member 74 is positioned in an upper location on the support structure, i.e., spaced outwardly from the pivot axis 42.

A second arm 80 of the actuator is pivotally secured to the seat base at 82. Thus, the actuator is connected to the seat back and the seat portion so that as the actuator arms 58, 80 rotate relative to one another about a common axis 84, the angle between the arms increases or decreases thereby reclining or raising the seat back 34 relative to the seat portion 32. Moreover, the interconnection of the movable seat back 74 through the link 70 and the first arm 58 of the actuator assures that a reduced shear seat back arrangement is provided for the user. The movable seat member 74 travels downwardly along the support structure 38 toward the pivot axis 42 as the seat back reclines.

Figure 2:
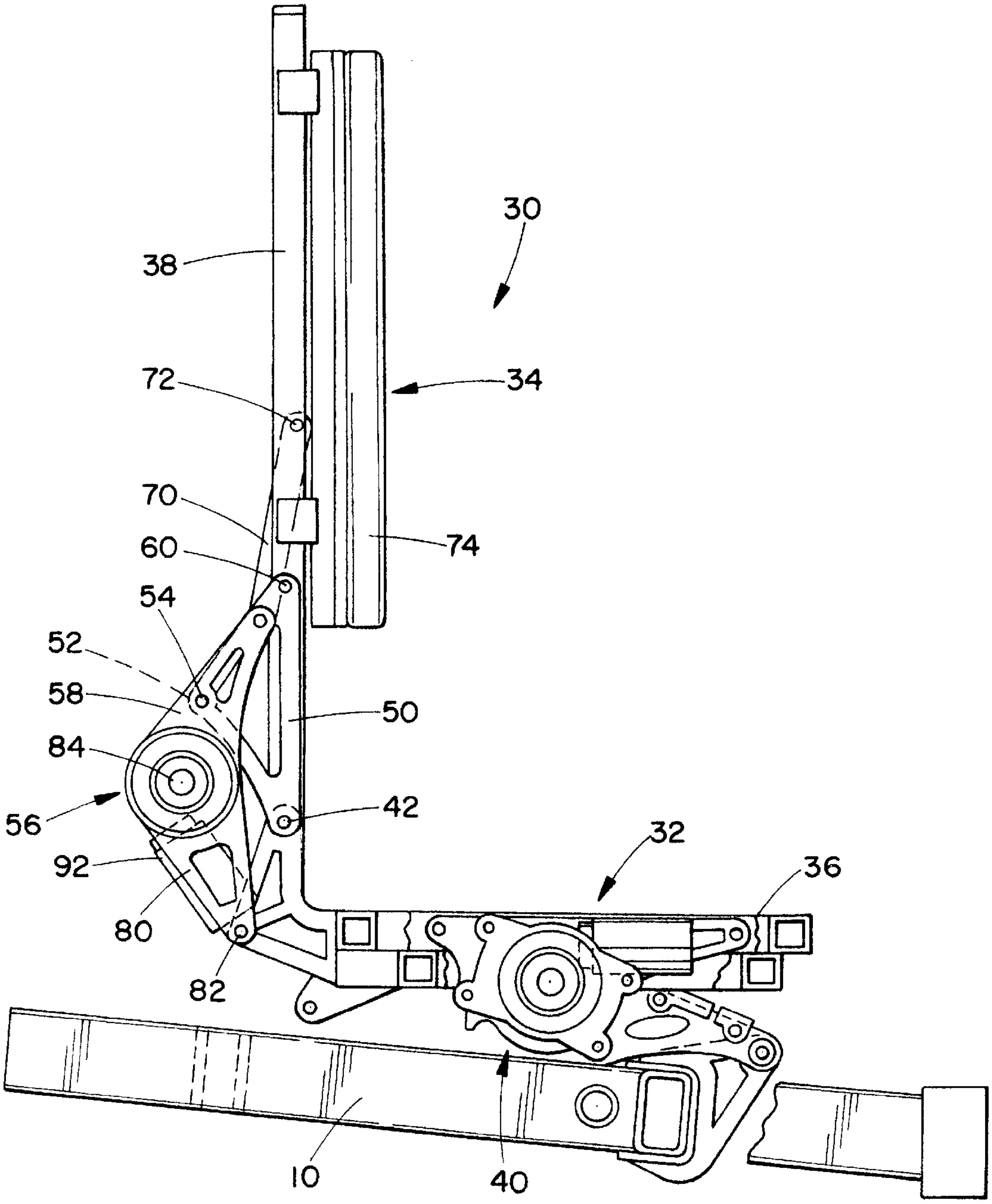
FIG. 2 is a side elevational view of selected components of the wheelchair of FIG. 1 and particularly illustrating the reduced shear seat back assembly in an upright position.
Figure 3:
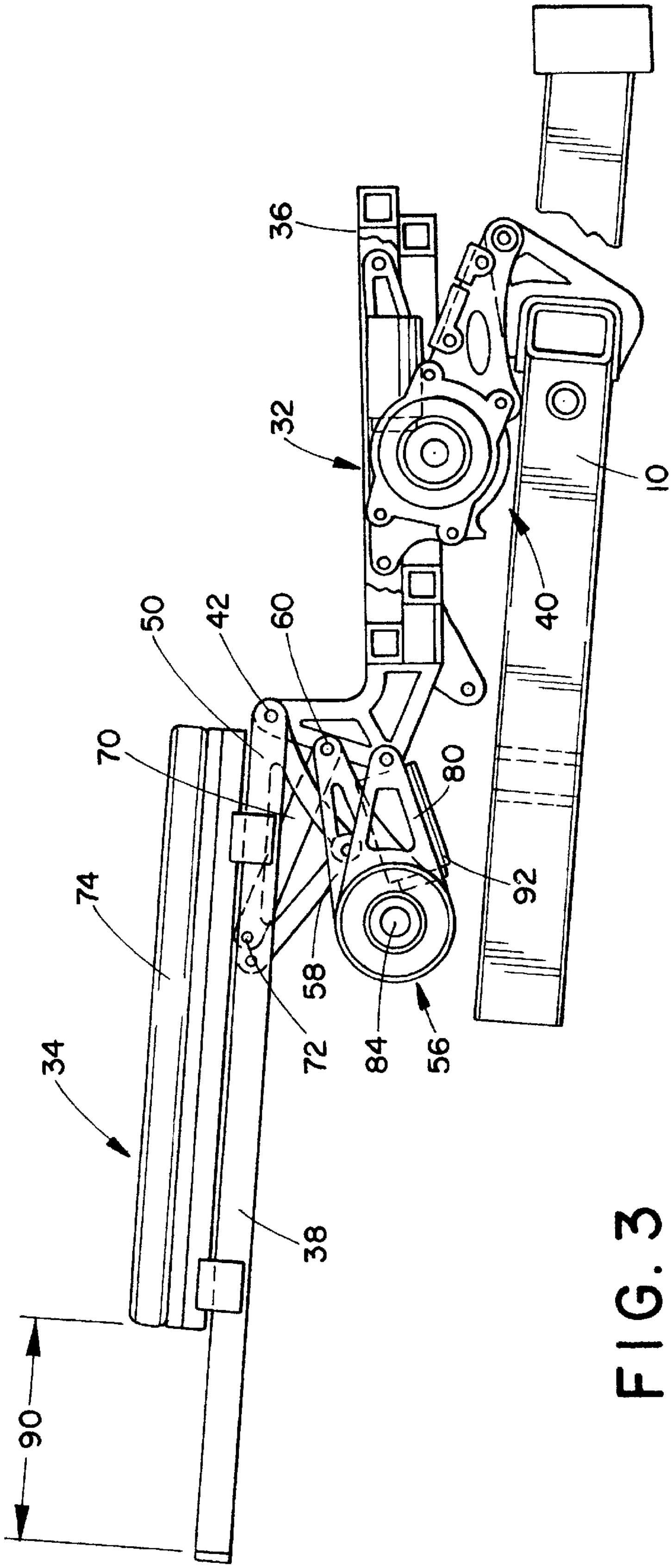
FIG. 3 is a view similar to FIG. 2 but showing the seat in a reclined position.

The movement of seat member 74 along the support structure is most evident by a comparison of FIGS. 2 and 3. As particularly shown in FIG. 3, the movable seat back member has traveled a distance represented by dimension 90. Thus, frictional forces that would otherwise be transferred to the back of a user are alleviated by the structure of the present invention. Moreover, a single actuator, via the arms 58, 80 which pivot or rotate about the common axis 84, both reclines the seat back and controls movement of seat member 74.

As will be recognized, the power recline and reduced shear seat back assembly of the present invention is easily adaptable to a power wheelchair where motor 92 drives the rotary actuator and can be easily powered by on-board batteries that drive the chair. Additionally, this assembly can be adapted to a seat that includes a tilt mechanism, i.e., where the seat portion and seat back can be tilted as a unit relative to the frame 10. Alternatively, the power recline and reduced shear seat back assembly can be used on other wheelchairs. As long as a power supply such as an on-board battery is provided, the reclining, no shear seat back assembly can be easily adapted to other wheelchairs. It can also be used with or without the tilt actuating mechanism 40. It provides a compact mechanism that is easily secured to a wheelchair seat without complex linkage and actuator assemblies.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A reclining, reduced shear seat back assembly for a wheelchair, the seat back assembly comprising:

a seat including a seat portion and a seat back;

the seat back having a pivot member adjacent a lower end thereof for allowing the seat back to move between upright and reclined positions relative to the seat portion and a movable back member that moves toward and away from the pivot member in response to reclining movement of the seat back; and a rotary actuator for selectively reclining the seat back relative to the seat portion including a first arm extending from the actuator and pivotally secured to the seat back through a link that has a first portion pivotally secured to the movable back member, and a second arm extending from the actuator and pivotally secured to the seat portion such that the seat back reclines as the angle changes between the first and second arms as they rotate relative to one another about an axis of rotation and the movable back member moves in response to the reclining seat back.

2. The seat back assembly of claim 1 wherein the link has a second portion that is pivotally secured to the first arm of the actuator.

3. The seat back assembly of claim 2 wherein movement of the first portion of the link is constrained to the plane of the seat back as the seat reclines.

4. The seat back assembly of claim 1 wherein the pivot axis is located intermediate the connection of the first arm to the seat back and the connection of the second arm to the seat portion.

5. The seat back assembly of claim 4 wherein the first arm and the seat back are pivotally connected at a region spaced from the plane of the seat back.

6. A wheelchair comprising:

a frame;

wheels rotatably secured to the frame for providing mobility;

a seat assembly mounted on the frame including a seat back that reclines about a pivot axis relative to a seat portion, and a movable seat member on the seat back for reducing shear forces transferred to the user as the seat back reclines; and a rotary actuator secured to the seat back for selectively reclining the seat back, the rotary actuator including first and second arms extending therefrom, the first arm being pivotally secured at a first end to the seat back and the second arm being pivotally secured at a first end to the seat portion whereby relative rotation about a common axis between the first and second arms reclines the seat back.

7. The wheelchair as defined in claim 6 further comprising a link having a first end pivotally secured to the movable seat member and a second end pivotally secured to the actuator first arm.

8. The wheelchair as defined in claim 7 wherein the link first end is limited to movement within a plane generally defined by the seat back as it reclines.

9. The wheelchair as defined in claim 6 wherein the first arm is pivotally secured to the seat back at a location spaced from the plane of the seat back.

10. The wheelchair as defined in claim 6 wherein the pivot axis is generally interposed between the first arm pivotal connection with the seat back and the second arm pivotal connection with the seat portion.

* * * * *